United States Patent
Andersson et al.

(10) Patent No.: US 6,519,461 B1
(45) Date of Patent: Feb. 11, 2003

(54) CHANNEL-TYPE SWITCHING FROM A COMMON CHANNEL TO A DEDICATED CHANNEL BASED ON COMMON CHANNEL LOAD

(75) Inventors: Christoffer Andersson, Palo Alto, CA (US); Johan Söderberg, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/430,165

(22) Filed: Oct. 29, 1999

(51) Int. Cl.[7] ................................. H04Q 7/20
(52) U.S. Cl. ................. 455/453; 455/450; 455/511
(58) Field of Search ........................ 455/422, 432, 455/436, 450, 453, 512, 513, 511; 370/235, 238, 328, 329, 338, 352–355, 437

(56) References Cited

U.S. PATENT DOCUMENTS

| | | |
|---|---|---|
| 5,319,638 A | 6/1994 | Lin |
| 5,434,848 A | 7/1995 | Chimento |
| 5,495,480 A | 2/1996 | Yoshida |
| 5,673,259 A | 9/1997 | Quick |
| 5,708,656 A | 1/1998 | Noneman et al. |
| 5,754,541 A | 5/1998 | Glisic et al. |
| 5,757,772 A | 5/1998 | Thornberg et al. |
| 5,778,175 A | 7/1998 | Paul et al. |
| 5,805,995 A | 9/1998 | Jiang et al. |
| 5,859,853 A | 1/1999 | Carlson |
| 5,901,147 A | 5/1999 | Joffe |
| 5,940,763 A * | 8/1999 | Alperovich et al. ........ 455/450 |
| 6,347,091 B1 * | 2/2002 | Wallentin et al. ........... 370/437 |

FOREIGN PATENT DOCUMENTS

| | | |
|---|---|---|
| EP | 0 746 172 A | 12/1996 |
| WO | 99/23842 A1 | 5/1999 |
| WO | 99/52307 A | 10/1999 |
| WO | 99/66748 A1 | 12/1999 |
| WO | 00/51245 A1 | 8/2000 |

OTHER PUBLICATIONS

*VTC'99*,ITESM, Center of Electronics and Telecommunications, Center for Artificial Intelligence, Monterrey N.L., Mexico, pp. 775–779, F. Cortés–Rodriguez et al., "Position Location Assisted Multi–Valued Logic Handoff Algorithm".

* cited by examiner

*Primary Examiner*—Nay Maung
(74) *Attorney, Agent, or Firm*—Nixon & Vanderhye, PC (57) ABSTRACT

Two different types of communications channels including first and second types are provided to support user connections in a communications system. A first type of channel supports a user connection. Thereafter, a current load or throughput on the first type of channel is detected. Based on the detected load or throughput, a corresponding data amount threshold is provided. A current amount of data to be transmitted over the user connection is detected. A determination is made whether to switch the user connection from the first type of channel to the second type of channel based on the current amount of data to be transmitted over the user connection and on the data amount threshold. In the example embodiment, the user connection is switched to the second type of channel when the current amount of data to be transmitted is greater than the data amount threshold. Otherwise, the user connection is maintained on the first type of channel.

25 Claims, 10 Drawing Sheets

CHANNEL-TYPE SWITCHING FROM A COMMON CHANNEL TO A DEDICATED CHANNEL BASED ON COMMON CHANNEL LOAD

RELATED INVENTION

This application is related to commonly assigned patent application Ser. No. 09/429,497, filed Oct. 29, 1999, entitled "Channel-Type Switching to a Common Channel Based on Common Channel Load."

FIELD OF THE INVENTION

The present invention relates to data communications, and in particular, to improving data communications by taking into account current transmission channel load or throughput when making channel type switching decisions.

BACKGROUND AND SUMMARY OF THE INVENTION

In current and future mobile radio communications systems, a variety of different services are and will be provided. While mobile radio communications systems have traditionally provided circuit-switched services, e.g., to support voice calls, packet switched data services are also becoming increasingly important. Example packet data services include e-mail, file transfers, and information retrieval using the Internet. Because packet data services often utilize system resources in a manner that varies over the course of a data packet session, the flow of packets is often characterized as "bursty." Transmitted packet bursts are interspersed with periods where no packets are transmitted so that the "density" of packets is high for short time periods and very low for long periods.

Mobile communications systems must accommodate both circuit-switched services and packet-switched services. But at the same time, the limited radio bandwidth must be used efficiently. Consequently, different types of radio channels may be employed to more efficiently accommodate different types of traffic to be transported across the radio interface. For example, one type of radio channel may be configured to more efficiently transport circuit-switched traffic and another type of radio channel may be configured to more efficiently transport packet-switched traffic.

The Global System for Mobile communications (GSM) is one example of a mobile communications system that offers circuit-switched services via a Mobile Switching Center (MSC) node and packet-switched services via a General Packet Radio Service (GPRS) node. For circuit-switched, guaranteed service, dedicated traffic channels are employed. A radio channel is temporarily dedicated (for the life of the mobile connection) to a particular mobile user and delivers frames of information as received without substantial delay. A dedicated channel generally provides a higher data throughput. For packet-switched, best effort service, common channels are employed where plural mobile users share the common channel at the same time. Typically, a common channel delivers packets of information at a lower data throughput than a dedicated channel. Thus, when the quality of service parameter(s) requested is (are) relatively high, e.g., for a speech or synchronized communication, soft/softer handover, etc., a dedicated channel may be selected. When the quality of service requested is relatively low, e.g., for an e-mail message, a common channel may be selected.

The selection of the appropriate channel type is particularly important in third generation mobile systems that employ Wideband Code Division Multiple Access (W-CDMA). The third generation wideband CDMA systems must support a variety of circuit-switched and packet-switched services over a wide range of bit rates, e.g., kilobits per second to megabits per second. Two of the most critical radio resources in wideband CDMA needed to support such services are channelization codes and transmission power. Channelization codes are used to reduce interference and to separate information between different users. The more channel capacity required, the more channelization codes needed. Other critical radio-related resource parameters include transmission power and interference level. Dedicated channels employ closed loop transmit power control which provides more accurate power assignments resulting in less interference and lower bit error rate. Common channels usually employ open loop power control which is less accurate and not as well suited for transmitting large amounts of data.

There are additional challenges in evolving wideband CDMA systems to offering new and diverse services while at the same time efficiently distributing the limited system resources. For example, while data traffic is by nature "bursty," as described above, traffic patterns are also affected by the particular transmission protocol employed. For example, the most commonly used transmission protocol on the Internet today is Transmission Control Protocol (TCP). TCP provides reliable, in-order delivery of a stream of bytes and employs a flow control mechanism and a congestion control mechanism. The amount of data delivered for transmission is regulated based on the amount of detected congestion, i.e., too many packets. To accomplish this regulation, when TCP senses the loss of a small number of packets, it reduces the transmission rate by half or more and then slowly increases that rate to gradually raise throughput. This congestion response mechanism may adversely impact the radio network throughput.

Another factor to be considered is the use of different Quality of Service (QoS) classes. For example, three different priority classes may be provided to users in a network: low priority would include users with small demands in throughput and delays (e.g., an e-mail user), medium priority users that demand a higher level of throughput (e.g., Web service), and high priority users requiring high throughput with low delays (e.g., voice, video, etc.).

Because of the bursty nature of packet data transmissions, congestion-sensitive transmission protocols, QoS parameters, and other factors making packet data transmissions quite dynamic, the channel-type best-suited to efficiently support a user connection may well change during the life of that user connection. At one point, it might be better for the user connection to be supported by a dedicated channel, while at another point, it might be better for the user connection to be supported by a common channel. The present invention determines if and when to make a channel-type switch for a particular user connection, and in particular, when to switch from a lower capacity or quality (e.g., a common channel) to a higher capacity or quality channel (e.g., a dedicated channel). One way of making that determination is a threshold comparison operation. When a data amount threshold is exceeded for a user connection supported by a lower capacity or quality channel, the connection is switched to a higher capacity or quality channel.

Figure 1:
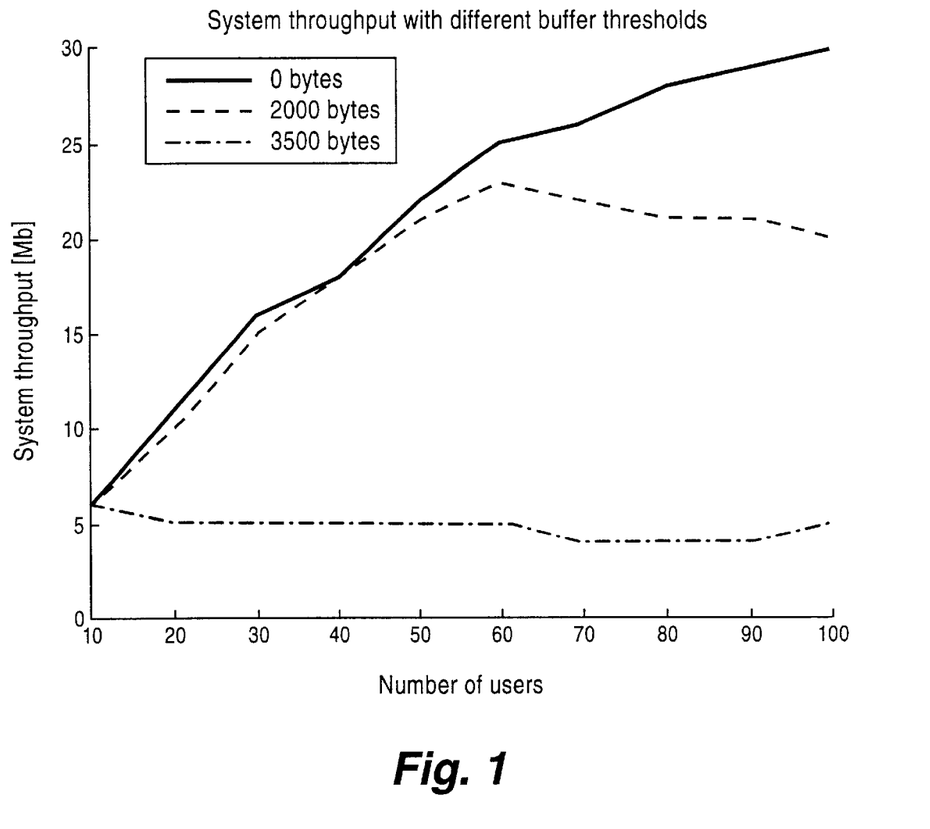
FIG. 1 is a graph illustrating system throughput versus number of users in a simulated channel switching scenario.

FIG. 1 is a graph which illustrates overall cellular system throughput in megabytes as a function of the number of user connections currently being supported by a common channel. The simulated traffic is "pro-dedicated," i.e., larger packets are transmitted and users are therefore best handled on a dedicated channel. Three different lines are shown including a solid line corresponding to a zero byte, channel type switching user connection transmit buffer amount threshold, a dashed line corresponding to a 2,000 byte threshold, and a dashed line corresponding to a 3,500 byte threshold. Since pro-dedicated traffic is simulated, the best throughput is achieved when a user connection is switched as fast as possible to a dedicated channel, i.e., a zero byte threshold. But this is not always the best strategy. If a user has a smaller amount of data to transmit, radio resources will be wasted if the user connection is switched immediately to a dedicated channel. On the other hand, if the threshold is too high, (e.g., 3,500 bytes), the system throughput is relatively low because little or no traffic is switched from the common to dedicated channels, and too much traffic is on the common channel. Better throughput along with reasonably efficient and effective use of radio resources are achieved with the lower channel switching threshold of 2,000 bytes. The throughput at this threshold is nearly as good as an ideal channel type switching threshold of zero bytes where virtually all of traffic is sent on a dedicated channel and none is sent on the common channel. Thus, a compromise threshold is a better value for determining which user connections can be adequately supported by a common channel and which would be better supported by a dedicated channel.

Figure 2:
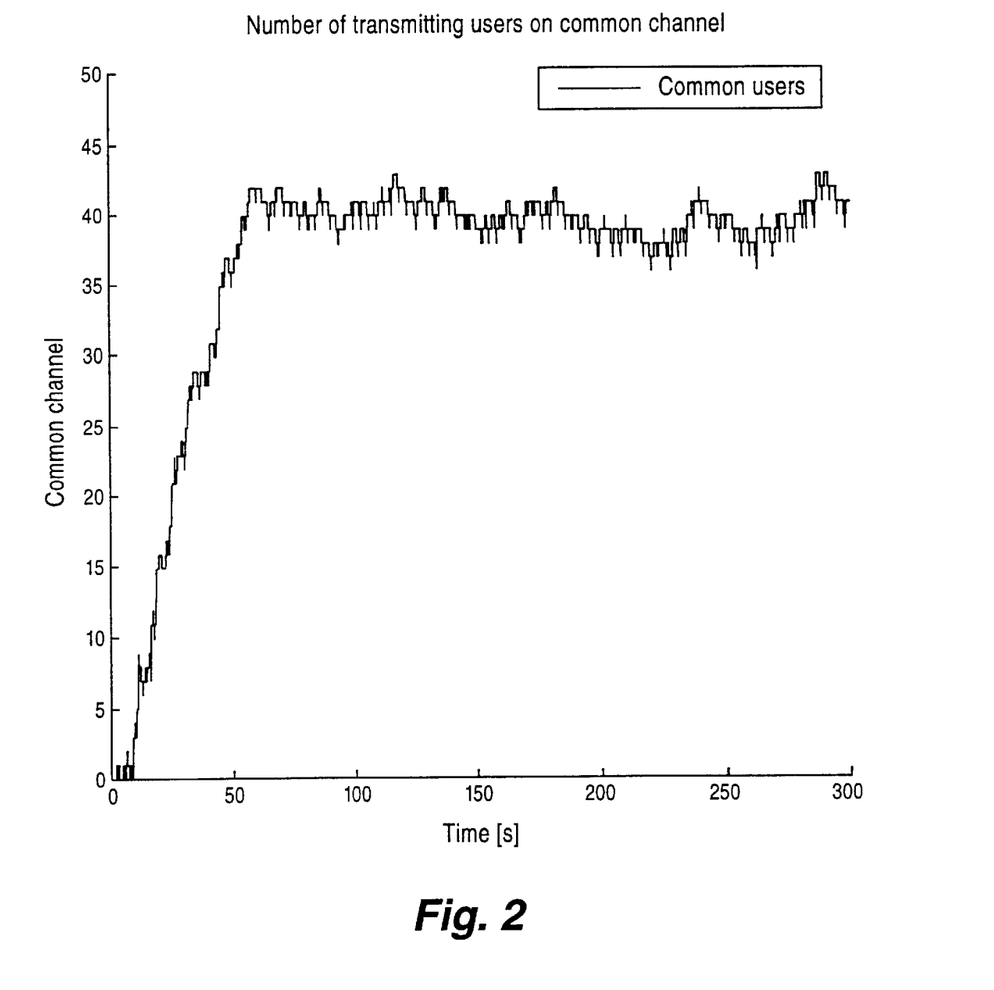
FIG. 2 is a graph illustrating a number of actively transmitting users on a common channel versus time in the simulated scenario of FIG. 1.

FIG. 2 graphs the common channel load with fifty users on the common channel and with a channel type switching threshold of 3,500 bytes. Out of fifty users, over forty users are trying to transmit on a common channel most of the time which yields an average throughput of only 0.4 kbit/s. The low throughput results from the congestion on the common channel.

The present invention solves the above-identified problems by taking into account the current load or throughput on the common channel when making a decision to switch a user connection from a lower capacity or quality channel like a common type of channel to a higher capacity or quality channel like a dedicated type of channel. At some point in time, a lower capacity or quality channel supports a user connection. Thereafter, a current load or throughput on the common channel is detected. Based on the detected load or throughput, a data amount threshold is provided. Different loads are associated with different thresholds. A current amount of data to be transmitted over the user connection is detected. A determination is made whether to switch the user connection from a common channel to a higher capacity or quality channel based (1) on the detected amount of data to be transmitted over the user connection and (2) on the provided data amount threshold. The user connection is switched to the higher capacity or quality channel when the detected amount of data to be transmitted is greater than the data amount threshold. Otherwise, the user connection is maintained on the first type of channel.

The load or throughput on the common channel may be determined based on a number of user connections currently being supported on the common channel and a data rate or data capacity of the common channel. The amount of data to be transmitted for a user connection may be determined by counting the number of data packets or bytes currently stored in a transmit buffer associated with a user connection. The determination of the data amount threshold may also take into account efficient use of the first type of channel and inefficiency created by performing channel-type switching. In one nonlimiting example embodiment, the present invention is implemented in a radio network control node.

A relationship may be established between the current load or throughput on the common channel and a corresponding amount threshold where as the current load increases, the channel switching threshold decreases. In one example embodiment, that relationship may be a simple linear type relationship. Alternatively, that relationship establishes a particular "mapping" between plural channel load values and plural data amount threshold values. In yet another example, the relationship establishes the data amount threshold value based on an estimated time to empty the amount of data currently in the user connection transmit buffer on the common channel at different common channel loads or throughputs. A maximum delay time or other quality of service (QoS) parameter associated with a user connection may be used to set the data amount threshold for that user connection. For a maximum delay time, the established buffer threshold associated with that time is set for the channel switching decision for the user connection.

With the present invention, better channel-type switching decisions may be made based upon the current capability of the system to effectively support such a channel switching decision. In the example embodiment, by taking into account the current load or throughput on the common channel, unnecessary or non-optimum channel-type switches to a dedicated or other higher capacity or quality channel are avoided. If the current load or throughput on the common channel is such that the needs of the user connection may be met, the user connection may remain on the common channel to allow more efficient use of dedicated channel radio resources.

BRIEF DESCRIPTION OF THE DRAWINGS

The foregoing and other objects, features, and advantages of the invention will be apparent from the following description of preferred example embodiments as well as illustrated in the accompanying drawings in which reference characters refer to the same parts throughout. While individual functional blocks and components are shown in many of the figures, those skilled in the art will appreciate these functions may be performed by individual hardware circuits, by a suitable programmed digital microprocessor, by an application specific integrated circuit (ASIC), and/or by one or more digital signaling processes (DSPs).

DETAILED DESCRIPTION OF THE DRAWINGS

In the following description, for purposes of explanation and not limitation, specific details are set forth, such as particular embodiments, network architectures, signaling flows, protocols, techniques, etc., in order to provide an understanding of the present invention. However, it will be apparent to one skilled in the art that the present invention may be practiced in other embodiments that depart from these specific details. For example, while the present invention is disclosed in the example non-limiting context of determining whether to switch a user connection from a common to a dedicated radio channel in a mobile radio communications system for purposes of illustration, those skilled in the art will appreciate the present invention can be applied to any type of channel type switching decision in any type of communications system, e.g., from a lower capacity or quality channel to a higher capacity or quality channel. In other instances, detailed descriptions of well-known methods, interfaces, devices, protocols, and signaling techniques are omitted so as not to obscure the description of the present invention with unnecessary detail.

Figure 3:
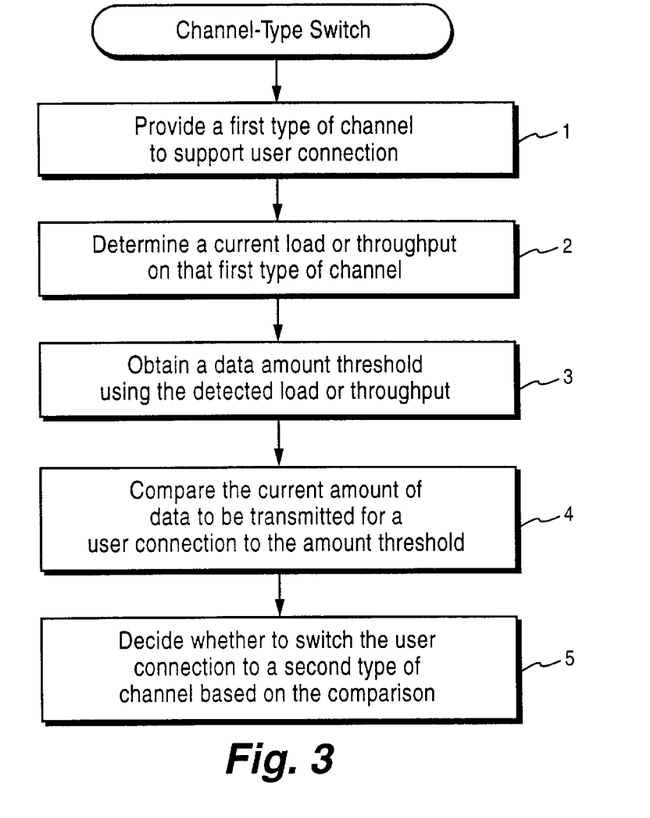
FIG. 3 is a flowchart type diagram illustrating a channel-type switching method in accordance with one example embodiment of the present invention.

A general example embodiment of the present invention is now provided with reference to the channel-type switching method illustrated in flowchart format in FIG. 3. The method may be implemented in any type of communications system (including both wired and wireless) where a user connection may be switched from one kind of channel to a different type of channel. Again, although common and dedicated channels are one example of different types of channels used in the following illustrations, channel switching can occur between two different common channels loaded to different degrees), two different dedicated channels (different capacities), and other distinguishable channel types.

A communications channel allocation entity provides a first type, e.g., a common type, of communications channel to support a user connection (block 1). A current load or throughput or other similar parameter on that channel is determined (block 2). A data amount threshold is then obtained using the detected load, throughput, or other parameter (block 3). The current amount of data to be transmitted for a user connection is compared to the obtained amount threshold (block 4). A determination is made whether to switch the user connection to a second type of channel, e.g., a dedicated type, based on the results of the comparison (block 5). This decision prevents or at least reduces undesirable switching of the user connection which would not improve the current communication condition.

More specifically, the user connection is not switched to a common channel if the current load or throughput on the common channel cannot handle in a satisfactory manner the current amount of data ready to be transmit for the user connection. Thus, while there might be a smaller amount of data ready for transmission, a channel-type switch is not made unless the current common channel load is sufficiently low or the common channel throughput is sufficiently high to ensure that this amount of data can be satisfactorily transmit within a desired time frame or with a desired quality of service.

The use of a dynamic threshold whose value depends on the current load on a common channel means that the overall system throughput on all channels is optimized. A common channel carries low volume traffic efficiently without the costs of unused dedicated channel resources and channel setup overhead. Heavier traffic conditions on the common channel lowers the threshold value so that traffic is switched more readily to a dedicated channel to maintain good overall throughput. By maintaining good throughput over the radio network, other adverse side effects/reactions in external networks e.g., TCP rate reduction measures, are avoided.

Figure 4:
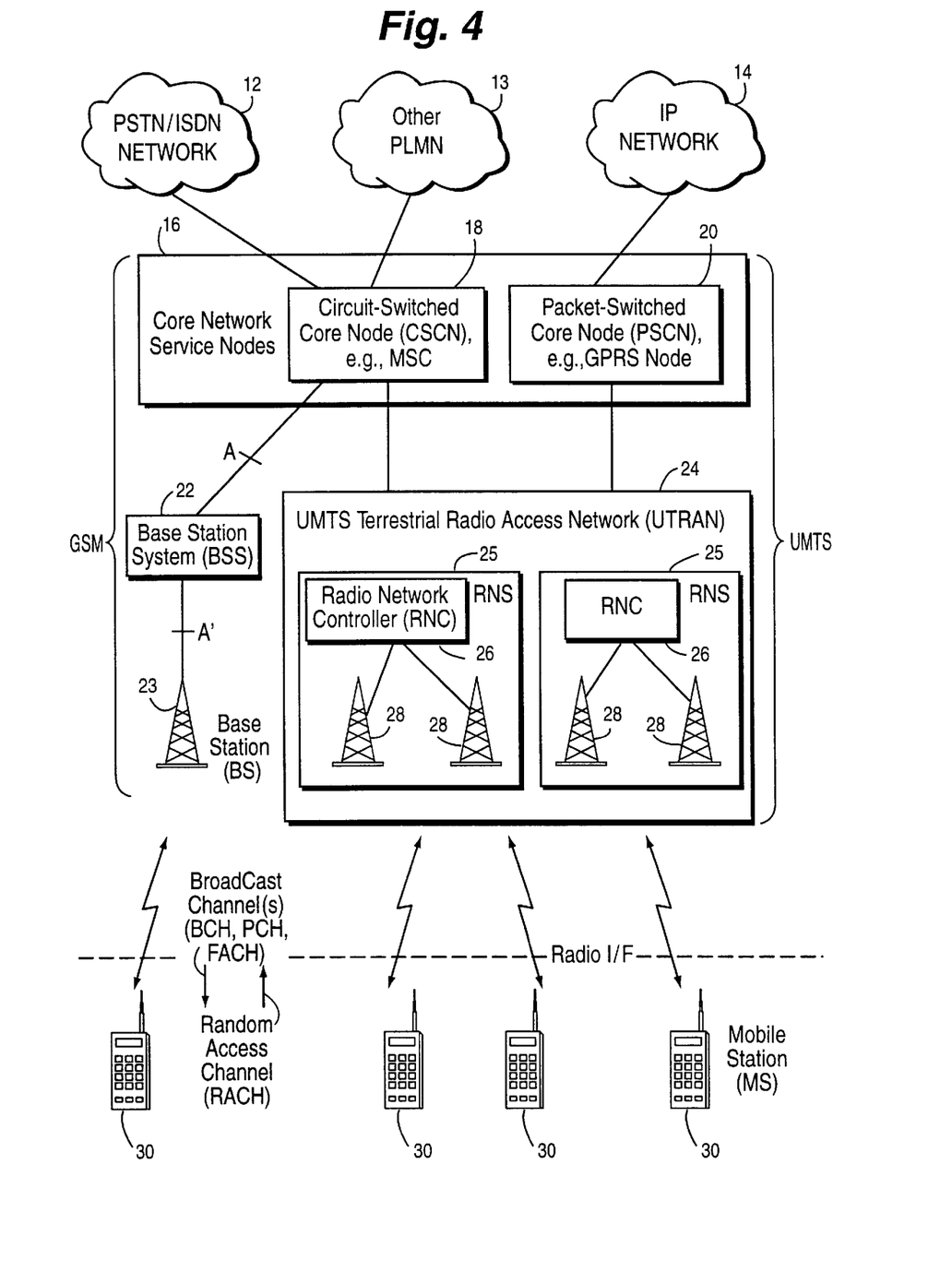
FIG. 4 is a function block diagram illustrating a mobile radio communications system in which the present invention may be advantageously employed.

One advantageous application of the present invention is now described in the non-limiting, example context of a mobile telecommunications system shown in FIG. 4. A representative, circuit-switched, external core network, shown as a cloud 12 may be for example the public switched telephone network (PSTN) and/or the integrated services digital network (SDN). Another circuit-switched, external core network may correspond to another Public Land Mobile radio Network (PLMN) 13. A representative, packet-switched, external core network shown as cloud 14 may be for example an IP network such as the Internet. The core networks are coupled to corresponding network service nodes 16. The PSTN/ISDN network 12 and other PLMN network 13 are connected to a circuit-switched core node (CSCN), such as a Mobile Switching Center (MSC), that provides circuit-switched services. In an existing cellular network model, here the Global System for Mobile Communications (GSM), the MSC 18 is connected over an interface A to a base station subsystem (BSS) 22 which in turn is connected to a radio base station 23 over an interface A'. The packet-switched network 14 is connected to a packet-switched core node (PSCN), e.g., a General Packet Radio Service (GPRS) node 20 tailored to provide packet-switched type services in the context of GSM which is sometimes referred to as the Serving GPRS Service Node (SGSN). Each of the core network service nodes 18 and 20 also connects to a UMTS terrestrial radio access network (UTRAN) 24 over a radio access network interface. The UTRAN 24 includes one or more radio network systems (RNS) 25 each with a radio network controller (RNC) 26 coupled to a plurality of base stations (BS) 28 and to the RNCs in the UTRAN 24.

Radio access in the GSM system employs well-established TDMA principles. Preferably, radio access over the radio interface in the UMTS system is based upon wideband, Code Division Multiple Access (WCDMA) with individual radio channels allocated using CDMA channelization or spreading codes. Of course, other access methods may be employed. WCDMA provides wide bandwidth for multimedia services and other high transmission rate demands as well as robust features like diversity handoff and RAKE receivers to ensure high quality communication service in a frequently changing environment. Each mobile station is assigned its own scrambling code in order for a base station 28 to identify transmissions from that particular mobile station. The mobile station also uses its own scrambling code to identify transmissions from the base station either on a general broadcast or common channel or transmissions specifically intended for that mobile station. That scrambling code distinguishes the scrambled signal from all of the other transmissions and noise present in the same area.

Different types of control channels are shown bridging the radio interface. For example, in the forward or downlink direction, there are several types of broadcast channels including a general broadcast channel (BCH), a paging channel (PCH), and a forward access channel (FACH) for providing various types of control messages to mobile stations. In the reverse or uplink direction, a random access channel ACK) is employed by mobile stations whenever access is desired to perform location registration, call origination, page response, and other types of access operations.

Figure 5:
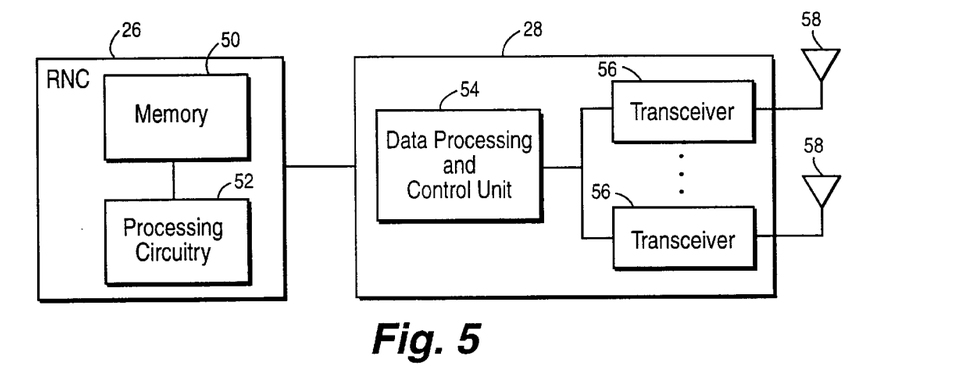
FIG. 5 is a function block diagram of a radio network controller and a base station shown in FIG. 4.

Simplified function block diagrams of the radio network controller 26 and base station 28 are shown in FIG. 5. The radio network controller 26 includes a memory 50 coupled to data processing circuitry 52 that performs numerous radio and data processing operations required to perform its control function and conduct communications between the RNC and other entities such as the core network service nodes, other RNCs, and base stations. Data processing circuitry 52 may include any one or a combination of suitably programmed or configured general purpose computer, microprocessor, micro-controller, dedicated logic circuitry, DSP, ASJC, etc., as described above. The base station 28 includes a data processing and control unit 54 which, in addition to performing processing operations relating to communications with the RNC 26, performs a number of measurement and control operations associated with base station radio equipment including transceivers 56 connected to one or more antennas 58.

Figure 6:
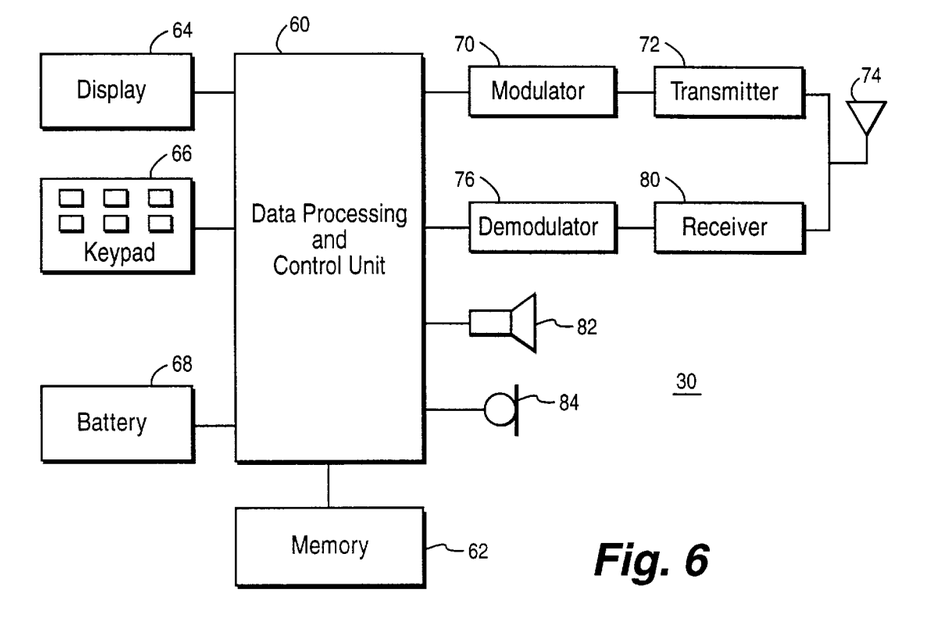
FIG. 6 is a function block diagram of the mobile station.

A simplified function block diagram of a mobile station 30 is shown in FIG. 6. The mobile station 30 includes an antenna 74 for transmitting signals to and for receiving signals from a base station 28. The antenna 74 is coupled to radio transceiving circuitry including a modulator 70 coupled to a transmitter 72 and a demodulator 76 coupled to a receiver 80. The radio transceived signals include signaling information in accordance with an air interface standard applicable to the wideband CDMA system shown in FIG. 4. The data processing and control unit 60 and memory 62 include the circuitry required for implementing audio, logic, and control functions of the mobile station. Memory 62 stores both programs and data. Conventional speaker or earphone 82, microphone 84, keypad 66, and display 64 are coupled to the data processing and control unit 60 to make up the user interface. A battery 68 powers the various circuits required to operate the mobile station.

Figure 7:
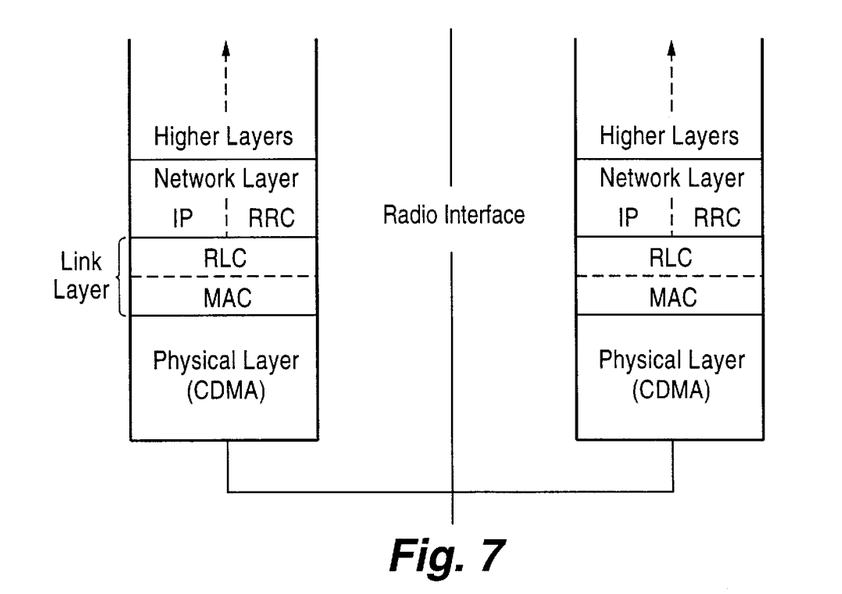
FIG. 7 is a diagram illustrating transmission protocol layers that may be employed in the mobile radio communications system shown in FIG. 4.

The radio interface shown in FIG. 4 is divided into several protocol layers with several lower level layers illustrated in FIG. 7. In particular, a mobile station uses these protocol layers to communicate with similar protocol layers in the UTRAN. Both protocol stacks include: a physical layer, a data link layer, a network layer, and higher layers. The data link layer is split into two sublayers: a radio link control (RLC) layer and medium access control (MAC) layer. The network layer is divided in this example into a control plane protocol (RRC) and a user plane protocol (JP).

The physical layer provides information transfer services over the air interface using wideband CDMA performs the following functions: forward error correction encoding and decoding, macrodiversity distribution/combining, soft handover execution, error detection, multiplexing and demultiplexing of transport channels, mapping of transport channels onto physical channels, modulation and spreading/demodulation and despreading of physical channels, frequency and time synchronization, power control, RF processing, and other functions.

The medium access control (MAC) layer provides unacknowledged transfer of service data units (SDUs) between peer MAC entities. The MAC functions include selecting an appropriate transport format for each transport channel depending on data rate, priority handling between data flows of one user and between data flows of different users, scheduling of control messages, multiplexing and demultiplexing of higher layer PDUs, and other functions. In particular, the MAC layer performs dynamic radio transport channel-switching functions. The RLC performs various functions including the establishment, release, and maintenance of an RLC connection, segmentation and reassembly of variable length, higher layer PDUs into/from smaller RLC PDUs, concatenation, error correction by retransmission (ARQ), in sequence delivery of higher layer PDUs, duplicate detection, flow control, and other functions. The transmit buffers assigned to mobile user connections are controlled at the RLC layer.

The control plane part of the network layer in the UTRAN consists of a radio resource control protocol (RRC). The RRC protocol allocates radio resources and handles the control signaling over the radio interface, e.g., radio access bearer control signaling, measurement reporting and handover signaling. The user plane part of the network layer includes the traditional functions performed by layer 3 protocols such as the well known Internet Protocol (IP).

Figure 8:
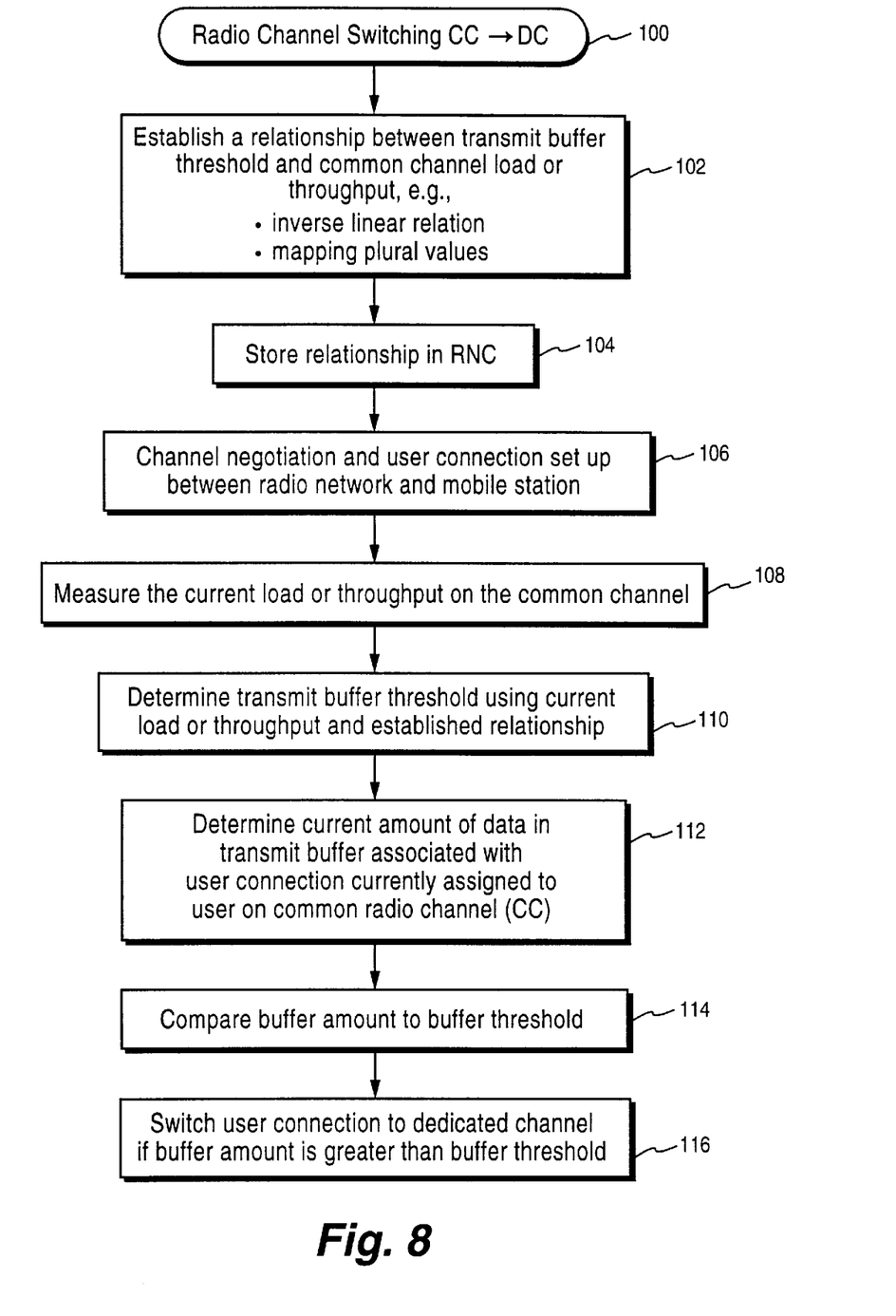
FIG. 8 is an example embodiment of a radio channel-type switching method that may be used in the mobile radio communications system shown in FIG. 4.

Reference is now made to the radio channel switching from a common channel (CC) to a dedicated channel PC) method (block 100) shown in FIG. 8 in accordance with an example embodiment of the invention. Again, this example embodiment of the present invention is disclosed in the non-limiting context of switching from a common type of radio channel to a dedicated type of radio channel as may be encountered from time to time, for example, in the wideband CDMA mobile communications system. In this example implementation, the invention may advantageously be implemented at the RLC and MAC protocol layers described above.

Figure 10:
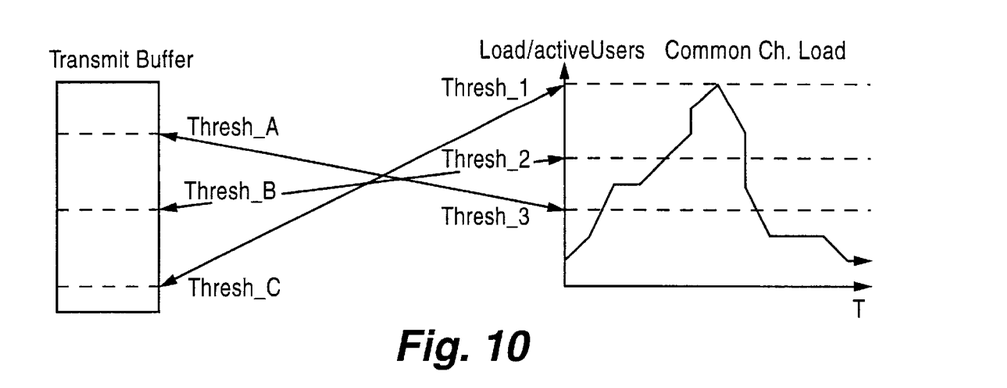
FIG. 10 is a diagram illustrating a mapping of various transmit buffer thresholds to corresponding common channel load thresholds.

Initially, a relationship is established between a user connection transmit buffer threshold and common channel load, throughput, or other parameter. Channel load or throughput are used hereafter for ease of description. For example, the mapping may be based on an inverse linear relationship such that as the common channel load increases, the amount threshold decreases. Alternatively, the mapping may be based on a proportional relationship between throughput and threshold so that as the throughput increases, the threshold increases. A greater throughput on the common channel means that the common channel can handle additional traffic so there is less need to switch the user connection to a dedicated channel if traffic on that connection increases. Hence, a higher switching threshold is provided. In a further additional example, the relationship could be based on a one-for-one mapping of plural transmit buffer threshold values and corresponding plural common channel load or throughput values. Reference is made in this regard to FIG. 10 which illustrates such a mapping of three transmit buffer thresholds A, B, and C to three common channel loads 1–3.

Returning to FIG. 8, the established relationship between transmit buffer threshold and common channel load or throughput is preferably stored, e.g., in a lookup table, in a radio network control node such as the RNC (block 104). Channel negotiation and user connection set up between the radio network and mobile station result in a common channel being provided at some point to support the user connection (block 106). The current load (or throughput) is measured on the common channel (block 108). The current load on the common channel may be determined from the current number of active users currently transmitting on the common channel divided by the capacity or data rate of the common channel. Alternatively, the throughput of the common channel may be determined from the capacity of the common channel divided by the current number of active users. Other parameters may be used to evaluate throughput or load. Returning to the flowchart, a corresponding transmit buffer threshold is determined using the measured current common channel load and the established relationship (block 110). For example, the current common channel load or throughput may be used as an input to extract from a lookup table a corresponding transmit buffer threshold. Alternatively, a mathematical equation or other relationship could be used to calculate the threshold using the current load (or throughput) as an input.

The current amount of data associated with the user connection to be transmit is determined, e.g., by counting the number of packets stored in a transmit buffer associated with that user connection (block 112). The determined amount of data in the transmit buffer is compared to the transmit buffer threshold (block 114). The user connection is switched to a dedicated channel if the buffer amount is greater than the buffer threshold (block 116). Although not illustrated, a similar algorithm could be employed to switch from a dedicated channel to a common channel if the buffer amount is less than a buffer threshold.

Figure 9:
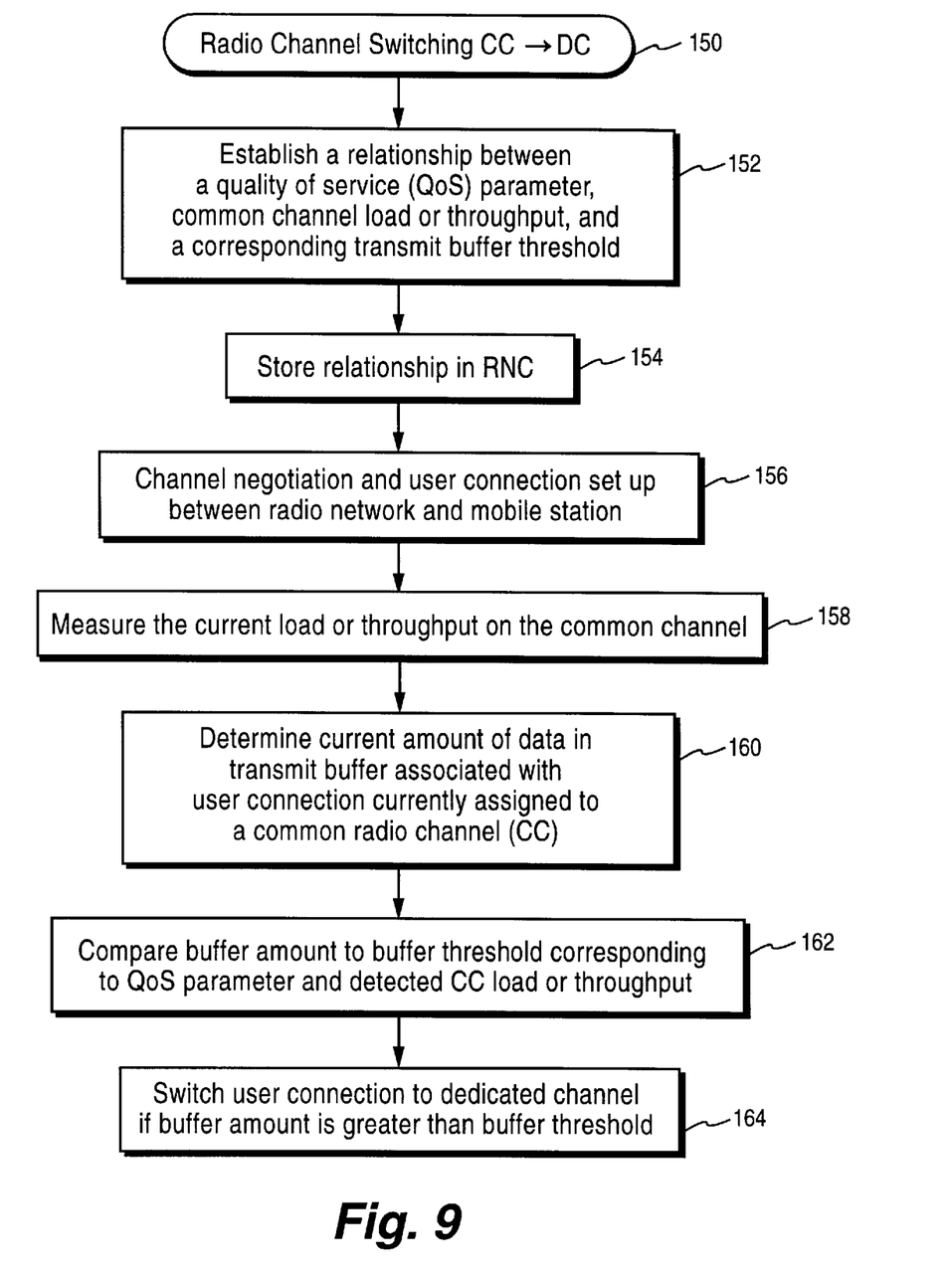
FIG. 9 is another example embodiment of a radio channel-type switching method that may be used in the mobile radio communications system shown in FIG. 4.

FIG. 9 shows another example radio transport channel-type switching method (block 150) in accordance with the present invention. In this example embodiment, a relationship is established between a quality of service (QoS) parameter, common channel load or throughput, and a corresponding transmit buffer threshold (block 152). That established relationship is stored in a radio network control node such as the RNC (block 154). As before, channel negotiation and user connection set up result in a common-type radio channel being provided at some point to support a user connection (block 156). The current common channel load or throughput is measured (block 158). That amount of data in the transmit buffer associated with the user connection is determined (block 160). The current amount of data in the transmit buffer is compared to a buffer threshold corresponding to one or more quality of service parameters associated with the user connection and a currently detected control channel load (block 162). The user connection is switched to a dedicated channel if the current buffer amount is greater than the buffer threshold (block 164). Likewise, this approach may be used to switch from a dedicated type to a common type channel.

One example of a quality of service parameter associated with a user connection is a maximum allowed delay time before that packet is transmitted. The established relationship may then be described as follows:

$$T=(D*C)/N$$

where T is the data amount threshold, D is a maximum allowed time for a data packet to be stored before being transmitted, C is the capacity of the common channel, and N is the number of active users currently transmitting on the common channel. Note that the threshold decreases either if the number of active users (N) increases (a lower throughput or higher load) or the maximum allowed delay time (D) decreases. The maximum allowed time delay is a quality of service parameter that may be specified when the user connection is established or sometime thereafter. As will be appreciated, different or additional quality of service parameters may also be taken into account in the established relationship with common channel load or throughput and corresponding transmit buffer threshold.

Figure 11:
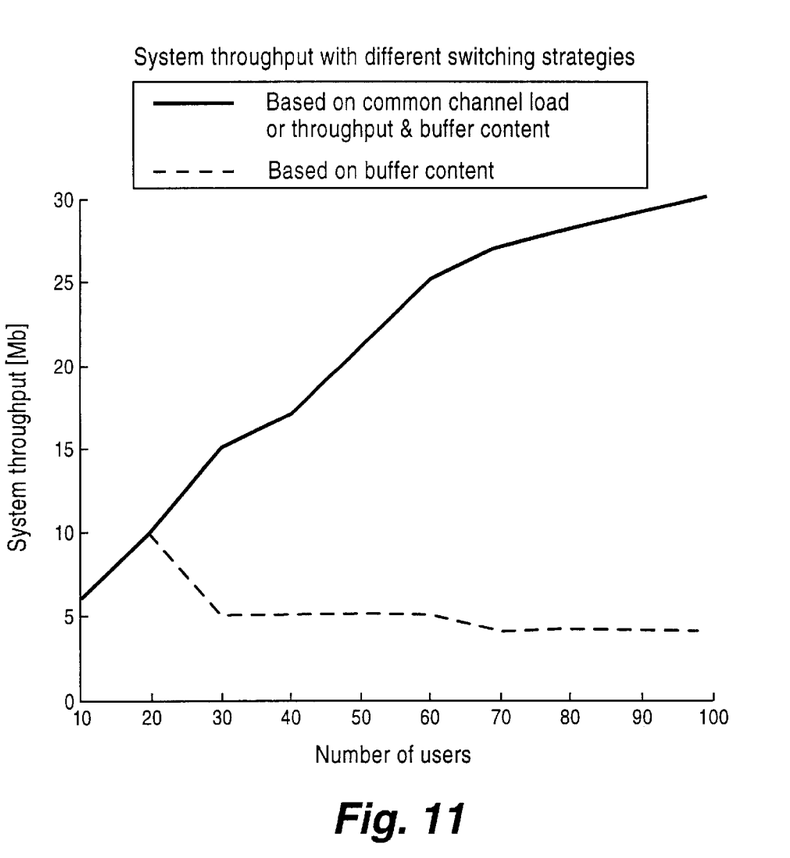
FIG. 11 is a graph illustrating system throughput achieved in a simulated channel switching scenario with different channel-type switching strategies versus number of users on a common channel.

FIG. 11 is a graph showing the advantages obtained by the present invention in a simulated channel switching scenario. System throughput (in megabytes) is plotted against a number of users actively communicating over the common channel. If the channel to switching decision is simply based on the amount of data in the transmit buffer, the system throughput decreases and then levels off at five megabytes at about thirty users. In contrast, at twenty users, where the system throughput for a channel switching decision based on buffer content already starts to deteriorate, the system throughput achieved by a channel switching strategy based on both common channel load or throughput and transmit buffer content continues to increase up to one hundred users. Thus, significant additional system throughput is achieved using the present invention. Indeed, the system throughput achieved by the invention is three to six times as great for thirty to one hundred users on the control channel, respectively, as compared to the buffer amount only approach.

Figure 12:
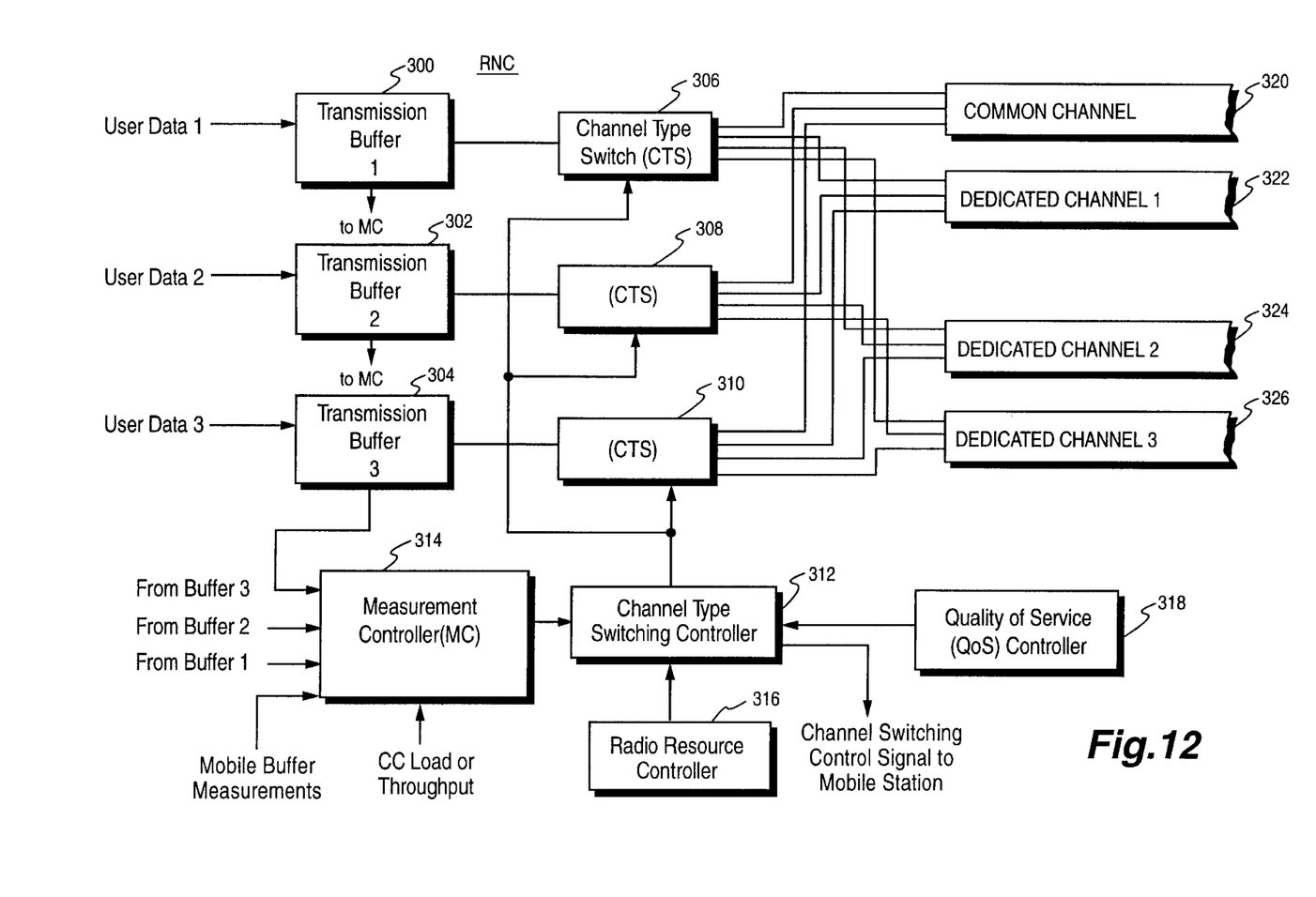
FIG. 12 is a function block diagram illustrating an example implementation of the invention in a radio network controller.

FIG. 12 illustrates an example implementation of the present invention as implemented in a radio network controller (RNC). In this example, three example user data connections 1, 2, and 3 are coupled to corresponding transmission buffers 1–3 (300–304), e.g., RLC buffers. The amount of data currently stored in each of the three transmission buffers is provided to the measurement controller (MC) 314. Measurement controller 314 also receives measurements of the common channel throughput or load and mobile station buffer amount measurement reports. Each transmission buffer is coupled to a corresponding channel-type switch (CTS) 306, 308, and 310, respectively, (e.g., implemented at the MAC layer). Each channel-type switch is controlled by a channel-type switching controller 312 which receives measurement inputs from the measurement controller 314, and if desired, additional inputs from radio resource controller 316 and quality of service controller 318. Radio resource controller 316 provides information to the channel-type switching controller 312 regarding the availability of radio resources. One or more quality of service parameters such as maximum allowed time delay, priority, etc. associated with the mobile user connection are provided by the quality of service controller 318. The measurement controller 314 provides measurement information to the channel-type switching controller 312 which makes threshold comparisons as described above in order to determine how to control the channel-type switches. If a channel-type switch is justified, for example from the common to a dedicated channel for user connection 1, the data packets from the transmission buffer 300 are routed by the channel-type switch 306 to the dedicated channel. Thus, based on the amount of data stored in each of the transmission buffers, the current throughput or load on the common channel, and/or other factors such as quality of service, available radio resources, etc., the channeltype switching controller 312 appropriately routes data from each of the transmission buffers via its respective channel-type switch 306-310 to the selected type of traffic channel.

Figure 13:
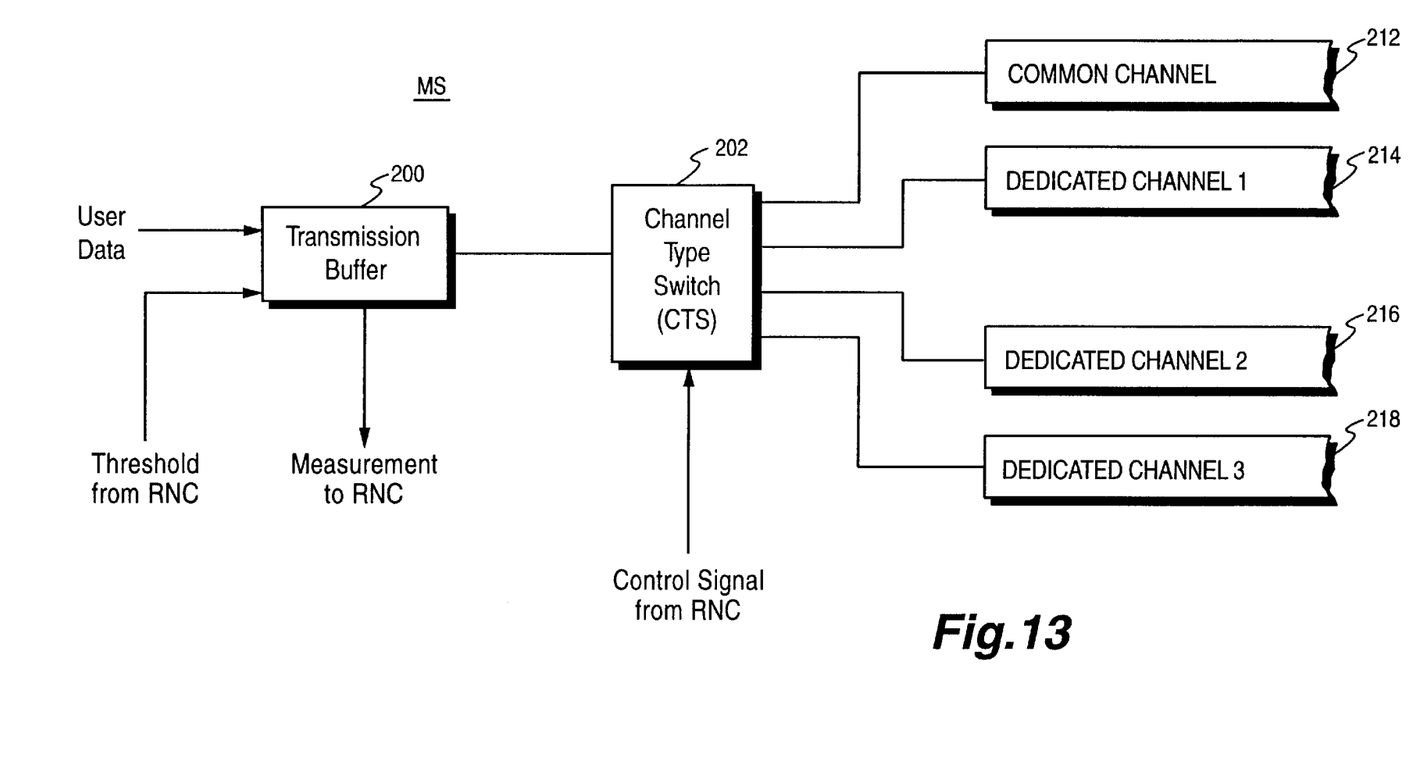
FIG. 13 is a function block diagram illustrating an example simplified implementation of a mobile station that may be used in connection with the radio network controller shown in FIG. 12.

An example implementation of the present invention in a mobile station (MS) is shown in function block format in FIG. 13. User data is received and stored at a transmission buffer 200, e.g., an RLC buffer. Packets from the transmission buffer 200 are routed to a channel-type switch (CTS) 202 (e.g., implemented at the MAC layer) to an appropriate communications channel including one or more common channels 212 or dedicated channels (DC1–DC3) 214–218.

The channel-type switch 202 is controlled by a channel switching control signal from the RNC. A total number of packets in the transmission buffer 200 is detected, and a measurement signal or alarm may be sent to the RNC periodically or after a specified event. This implementation permits minimal changes to the mobile terminal.

While the present invention has been described in terms of a particular embodiment, those skilled in the art will recognize that the present invention is not limited to the specific example embodiments described and illustrated herein. Different formats, embodiments, and adaptations besides those shown and described as well as many modifications, variations, and equivalent arrangements may also be used to implement the invention. Accordingly, it is intended that the invention be limited only by the scope of the claims appended hereto.

What is claimed is:

1. In a mobile radio communications system having two different types of communications channels including a first type of channel and a second type of channel, a method comprising:

providing the first type of channel to support a user connection;

detecting a current load or throughput on the first type of channel;

providing a data amount threshold based on the detected load or throughput;

detecting an amount of data to be transmitted over the user connection; and determining whether to switch the user connection from the first type of channel to the second type of channel based on the detected amount of data to be transmitted over the user connection and on the provided data amount threshold.

2. The method in claim 1, further comprising:

switching the user connection to the second type of channel when the detected amount of data to be transmitted is greater than the data amount threshold.

3. The method in claim 2, further comprising:

maintaining the user connection on the first type of channel if the detected amount of data to be transmitted is not greater than the amount data threshold.

4. The method in claim 3, wherein the first type of channel is a common radio channel allocated to support plural user connections and the second type of channel is a dedicated radio channel temporarily reserved for one user connection.

5. The method in claim 3, wherein the first type of channel is a higher capacity or quality channel than the second type of channel.

6. The method in claim 1, further comprising:

establishing a relationship between the current load or throughput on the first channel and the amount threshold where as the current load increases or as the current throughput decreases, the amount threshold decreases.

7. The method in claim 6, wherein the relationship is a linear relationship.

8. The method in claim 6, wherein the relationship establishes a mapping between plural channel load values and plural data amount threshold values.

9. The method in claim 1, further comprising:

establishing a relationship between the current load or throughput on the second channel and the amount threshold, wherein the relationship establishes a size of the data amount threshold based on an estimated time to empty the buffer on the second type of channel at the current load or throughput.

10. The method in claim 1, wherein the data amount threshold is determined in accordance with the following:

$$T = (D*C)/N$$

where T is the data amount threshold, D is a maximum allowed time delay for a data packet to be stored before being transmitted, C is the capacity of the first type of channel, and N is the number of active users currently on the first type of channel.

11. The method in claim 10, wherein a maximum allowed time delay is defined for a user connection.

12. In a mobile radio communications system having two different types of communications channels including a dedicated type of channel temporarily reserved for one mobile radio user and a common type of channel shared by plural mobile radio users, where data packets corresponding to a mobile user connection are stored in a transmit buffer before being transmit over a channel assigned to the mobile user connection, a method comprising:

relating plural common channel throughput or load values to corresponding plural transmit buffer thresholds, and using the related common channel throughput or load values and transmit buffer thresholds in channel type selection decisions to support the mobile user connection.

13. The method in claim 12, further comprising:

detecting a current common channel throughput or load;

comparing the transmit buffer threshold corresponding to the detected current common channel throughput or load to a current amount of data stored in the transmit buffer; and selecting the common channel for the mobile user connection if the current amount of data stored in the transmit buffer does not exceed the compared transmit buffer threshold.

14. In a mobile radio communications system having two different types of communications channels including a dedicated type of channel temporarily reserved for one mobile radio user and a common type of channel shared by plural mobile radio users, where data packets corresponding to a mobile user connection are stored in a transmit buffer before being transmit over a selected channel, a method comprising:

relating plural common channel throughput or load values to corresponding plural values of a quality of service parameter, and using the related common channel throughput or load values and corresponding plural values of the quality of service parameter in channel type selection decisions to support the mobile user connection.

15. The method in claim 14, further comprising:

detecting a current common channel throughput or load;

comparing a value of the quality of service parameter associated with the mobile radio user connection with the quality of service parameter value corresponding to the detected current common channel throughput or load; and selecting the common channel to support the mobile radio user connection from the dedicated channel to the common channel if the value of the quality of service parameter associated with the mobile radio user connection is satisfied by the quality of service parameter value corresponding to the detected current common channel throughput or load.

16. The method in claim 14, further comprising:

switching a mobile radio user connection from the common channel to the dedicated channel if the value of the quality of service parameter associated with the mobile radio connection is not satisfied by the quality of service parameter value corresponding to the detected current common channel throughput or load.

17. The method in claim 14, the method further comprising:

determining the throughput or load on the common channel based on a number of user connections currently being supported on the common channel and a data rate of the common channel.

18. The method in claim 15, wherein the selecting step includes taking into account one or more other parameters.

19. In a mobile communications system including plural base stations coupled to a controller and communicating over a radio interface with mobile stations, a radio network control node comprising:

plural buffers, each buffer assignable to support a mobile user connection and having a first threshold;

channel-type switching circuitry, coupled to the buffers, controllably switching a user connection from a first type of radio channel to a second type of radio channel;

a measurement controller obtaining measurements of a current amount of data stored in each buffer and of a current load or throughput on the first type of radio channel; and a channel-type switching controller controlling the channel-type switching circuitry to direct the data corresponding to one of the mobile user connections stored in one of the buffers from the first type of radio channel currently supporting the one mobile user connection to the second type of radio channel based on the measurements from the measurement controller relating to the current amount of data stored in the one buffer and on the current load or throughput.

20. The control node in claim 19, wherein the control node corresponds to a radio network controller coupled to plural base stations.

21. The control node in claim 19, wherein the first type of radio channel is one of a dedicated radio channel temporarily reserved for one mobile user and a common radio channel shared by plural mobile users and the second type of radio channel is the other of the dedicated radio channel and the common radio channel.

22. The control node in claim 19, further comprising:

a radio resource controller coupled to the channel-type switching controller, wherein the channel-type switching controller controls the channel-type switching taking into account an availability of radio resources provided by the radio resource controller.

23. The control node in claim 19, further comprising:

a quality of service controller providing quality of service parameter information to the channel-type switching controller, wherein the channel-type switching controller controls the channel-type switching taking into account a quality of service parameter associated with the mobile user connection provided by the quality of service controller.

24. In a mobile radio communications system having two types of communications channels including a first type of channel and a second type of channel, wherein a user connection is supported by the first type of channel, an apparatus comprising:

means for providing plural data amount thresholds and associated current load or throughput thresholds;

means for detecting a current amount of data to be transmitted for the user connection and a current load or throughput on a first type of channel; and means for switching the user connection from the first type of channel to the second type of channel if the detected amount of data is greater than the data amount threshold associated with the current load or throughput.

25. The apparatus in claim 24, wherein the data amount threshold is determined in accordance with the following:

$$T=(D*C)/N$$

where T is the data amount threshold, D is a maximum allowed time for a data packet to be stored before being transmitted, C is the capacity of the second type of channel, and N is the number of active users currently on the second type of channel.

* * * * *